(No Model.)

C. H. CHAPMAN.
Limekiln.

No. 230,742. Patented Aug. 3, 1880.

WITNESSES:
Fred G. Dieterich
P. L. Dieterich

INVENTOR:
Charles H. Chapman,
by Louis Bagger & Co.
ATTORNEYS

UNITED STATES PATENT OFFICE.

CHARLES H. CHAPMAN, OF JOPLIN, MISSOURI.

LIMEKILN.

SPECIFICATION forming part of Letters Patent No. 230,742, dated August 3, 1880.

Application filed April 19, 1880. (No model.)

*To all whom it may concern:*

Be it known that I, CHARLES H. CHAPMAN, of Joplin, in the county of Jasper and State of Missouri, have invented certain new and useful Improvements in Lim kilns; and I do hereby declare that the following is a full, clear, and exact description of the invention, which will enable others skilled in the art to which it appertains to make and use the same, reference being had to the accompanying drawings, which form a part of this specification, and in which—

Figure 1:
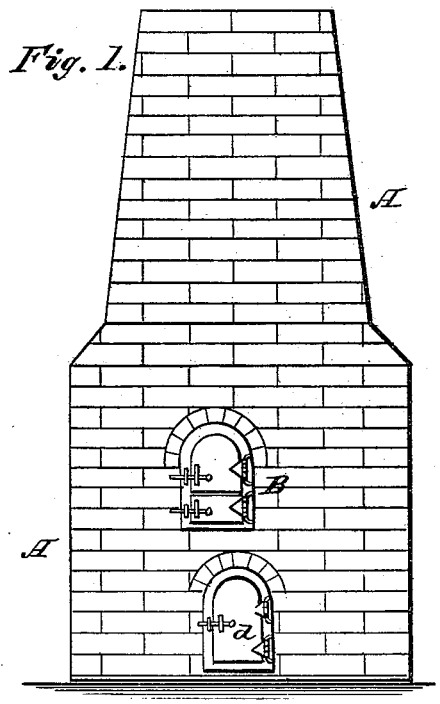
Figure 2:
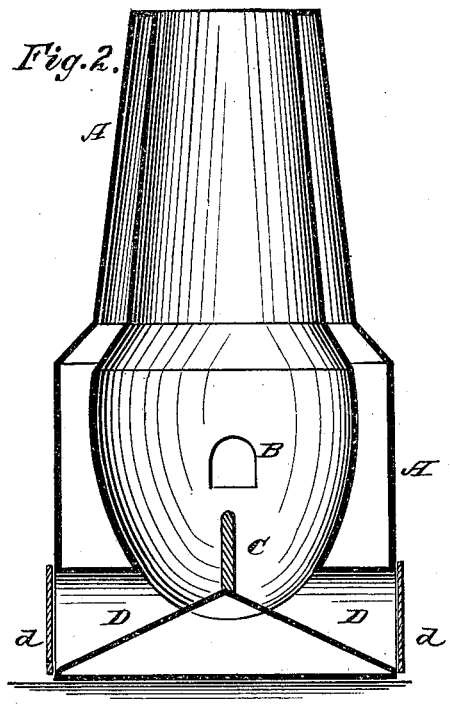

Figure 1 is a side elevation of my improved limekiln. Fig. 2 is a vertical section of the same, and Fig. 3 is a horizontal section taken through the furnaces or upper eyes.

This invention has relation to improvements in limekilns, the object of which is to effect the proper and thorough burning of the lime, to obviate the clogging or choking of the contents of the kiln, to prevent the contents entering the eyes, to intercept the latter entering and stopping up the discharge-eyes, and to enable the discharge of the lime in a comparatively cool state; and it consists in the improvement hereinafter fully described, and particularly pointed out in the claim.

In the annexed drawings, A marks the outer wall of the kiln, built preferably of brick or stone, while the inner wall is constructed of fire-bricks in a conical or tapering cylindrical form, with the taper toward the upper end of the kiln, and the bottom rounding and its sides converging at the base, as clearly seen in Figs. 1 and 2. The aforesaid construction, which gives the greatest width about opposite where the eyes or furnaces are usually located, and as is the case with this kiln, as will more fully be set forth presently, and narrows the chamber above them, thereby, while subjecting the greatest bulk of the contents of the kiln to the direct action of the fire, concentrates the upwardly-ascending heat, thus intensifying it upon the contents most remote from the direct action of the fire, to effect the ready conversion of its contents at that point as well into lime, and thereby thoroughly and properly convert or burn its contents.

Figure 3:
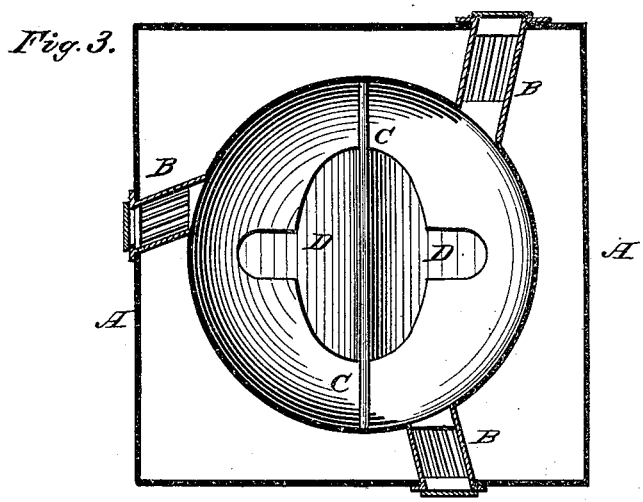

B B mark the upper eyes or furnaces, which are located in the walls of the kiln about opposite the greatest width of the kiln or its chamber, and obliquely in a horizontal plane to its chamber, as seen in Fig. 3, the object of which is to prevent the contents of the kiln entering them to any appreciable extent, and to cause the hot air or heat-currents to strike obliquely on the said contents, which will have the tendency to impart to the inrushing currents of heat a rotary motion, belting the contents with the combined action of the heat of all the eyes or furnaces before rising in a concentrated form into the tapering or narrow part of the chamber to act on the superposed limestone or other substance to be acted on and converted into lime. This greatly augments the heat at all points upon the contents of the kiln.

C is a partition placed in the bottom of the chamber of the kiln to serve to support the limestone or other substance previous to its conversion, to permit the converted or lime portion to flow down on each side thereof, to enter and be discharged from the chamber in a comparatively cool state through inclined chutes D, having doors $d$ in the outer wall of the kiln. Convenient access to the eyes can be had by platforms or otherwise.

Having thus described my invention, I claim and desire to secure by Letters Patent of the United States—

In a limekiln, the eyes or furnaces located obliquely in a horizontal plane to the inner chamber of the kiln, substantially as and for the purpose specified.

In testimony that I claim the foregoing as my own I have hereto affixed my signature in presence of two witnesses.

CHARLES H. CHAPMAN.

Witnesses:
JOHN H. MADDY,
FRED. E. CHAPMAN.